Patented Oct. 31, 1950

2,527,916

UNITED STATES PATENT OFFICE 2,527,916

AZEOTROPIC DISTILLATION OF VINYL AROMATIC COMPOUNDS

John W. Churchill, Kenmore, N. Y., assignor to Mathieson Chemical Corporation

No Drawing. Application December 7, 1948, Serial No. 64,041

6 Claims. (Cl. 202—42)

This invention relates to the purification of vinyl aromatic compounds by azeotropic distillation and, more particularly, to the separation of vinyl aromatic compounds in a state of high purity from crude vinyl aromatic compositions containing substantial proportions of contaminating compounds of corresponding molecular structure except that they have a chloroethyl group in place of the vinyl group. In its broader aspect, the invention contemplates the azeotropic distillation of such vinyl aromatic compounds using as the entraining agent a monoalkyl ether of diethylene glycol which forms with the vinyl aromatic an azeotrope boiling at a temperature lower than the boiling temperature of the non-vinyl aromatic constituents or of their azeotropes with the entraining agent.

An especially useful method for manufacturing vinyl aromatic compounds, particularly those containing nuclear substituents, is the dehydrohalogenation of the corresponding chloroethyl aromatic compound. By this process, even using the most effective known dehydrohalogenation catalyst, theoretical yields of the vinyl aromatics are generally not obtained but the process results in a crude product containing the desired vinyl aromatic contaminated by the presence of a considerable quantity of the unreacted chloroethyl aromatic.

The separation of the desired vinyl aromatics from such contaminants by ordinary distillation has presented a troublesome problem, not only because of similarity in boiling point in some instances, but also because of the tendency of these vinyl aromatic compounds to polymerize upon heating. Certain substituted vinyl aromatic compounds, for example, the nuclear dichlorostyrenes, are so prone to polymerize that it has been difficult to obtain satisfactory yields by distillation of the crude composition even when using reduced pressure and the most effective known inhibitors of polymerization.

It has heretofore been proposed to separate styrene by azeotropic distillation from a styrene-ethyl benzene mixture resulting from the dehydrogenation of ethyl benzene to produce styrene. In accordance with such proposal, an entraining agent is used which, with the ethyl benzene, forms an azeotrope boiling at a temperature lower than the boiling point of the styrene or its azeotrope with the styrene. By such procedure, the styrene is recovered as the bottoms from the distillation. Accordingly, the styrene is subjected to prolonged heating while the unpolymerizable ethyl benzene is carried off promptly from the distilling zone. This prolonged heating of the styrene tends further to promote its polymerization.

This prior art method of separation wherein the polymerizable vinyl aromatic is recovered as bottoms is especially unsatisfactory for the separation of certain nuclear substituted styrenes, particularly the nuclear dichlorostyrenes, which polymerize at much more rapid rates than does styrene. The dichlorostyrenes, for instance, may be prepared by the dehydrohalogenation of chloroethyl dichlorobenzenes, resulting in a mixture of nuclear dichlorostyrenes and chloroethyl dichlorobenzenes. The separation of the dichlorostyrenes from the corresponding chloroethyl compounds has, by prior art procedure, resulted in substantial polymerization, even where the most effective known inhibitors of polymerization have been used.

The present invention is based on my discovery that polymerizable vinyl aromatic compounds may be separated as an overhead distillate from contaminating chloroethyl compounds of corresponding structure by azeotropic distillation using as the entraining agent a monoalkyl ether of diethylene glycol. The said monoalkyl ether and the polymerizable vinyl aromatic compound, have been found to form an azeotrope which will distill off overhead leaving behind the chloroethyl compound or its azeotropes for recovery as bottoms.

The present invention is applicable to the separation of a wide variety of vinyl aromatic compounds from the corresponding chloroethyl compounds, including the separation of styrene itself as well as parachlorostyrene, paramethylstyrene, alpha, paradimethyl styrene, the dichlorostyrenes (including in that term all the individual isomers such as 2,4-dichlorostyrene, 2,3-dichlorostyrene, 3,4-dichlorostyrene or 2,5-dichlorostyrene and mixed isomers of the dichlorostyrenes containing any or all of the isomers in any proportions), the trichlorostyrenes (individual isomers or mixtures thereof), pentachlorostyrene, alpha and beta vinyl naphthalene, vinyl thiophene, vinyl carbazole or other vinyl aromatic compounds.

The selection of a particular monoalkyl ether of diethylene glycol for use as the entrainer will, for optimum results, depend somewhat upon the particular vinyl aromatic to be distilled. For instance, the monomethyl ether of diethylene glycol has been found particularly suitable for the separation of dichlorostyrenes from chloroethyl dichlorobenzenes and of lower boiling vinyl aromatic compounds from contaminating corresponding chloroethyl compounds. As the boiling point of the vinyl aromatic to be separated increases, higher alkyl ethers of diethylene glycol are, with advantage, used, including the monoethyl ether, the monobutyl ethers, the mono isoamyl ether and so on. However, any of the known monoalkyl ethers of diethylene glycol may be used with advantage.

In order further to avoid polymerization of the vinyl aromatic compounds, it is usually preferred to incorporate suitable inhibitors in the distilling mixture. Any effective inhibitor may be used but those of the phenolic type are particularly effective. Specific examples of suitable inhibitors are tertiary butyl catechol, ditertiary butyl catechol, diamyl hydroquinone, ditertiary butyl hydroquinone, dichloroquinone as well as the nitroso phenols, for instance, alpha nitroso beta naphthol.

Still further to avoid polymerization of the vinyl aromatic compounds, it is preferred to distill the crude vinyl aromatic azeotropically under reduced pressure. Generally, the greater the reduction of pressure, the better, but practical operations are usually within the range of 5 to 50 mm. of mercury absolute pressure. I usually prefer to operate at a pressure below about 25 mm. absolute.

The following examples are given for the purpose of illustrating the invention, it being understood that the scope and utility of the invention is not so restricted.

Example I

To 100 milliliters of a crude mixture of dichlorostyrenes resulting from the dehydrochlorination of mixed chloroethyl dichlorobenzenes and containing 18.2% by weight of chloroethyl dichlorobenzenes (3.09% by weight of side-chain chlorine) and 81.8% by weight, or 82.8% by volume, of dichlorostyrenes by difference, there was added 200 milliliters of monomethyl ether of diethylene glycol, 1 gram ditertiary butyl catechol, 1 gram 2,5-dichloroquinone and 1 gram diamyl hydroquinone. This mixture was subjected to distillation at an absolute pressure of 15 millimeters of mercury and there was taken off overhead at a temperature of 86–90° C., 83.8 milliliters of the dichlorostyrenes as an azeotrope with the entraining agent. Upon separating the entraining agent from the mixed dichlorostyrenes, the latter was water-washed and dried and was found by analysis to contain only 0.042% by weight of side-chain chlorine. This separation was effected without substantial polymerization of the dichlorostyrenes.

Example II

To 150 milliliters of a crude mixture of dichlorostyrenes having an iodine number of 46.6, containing 31.7% by weight or 33.2% by volume of dichlorostyrenes and resulting from the dehydrochlorination of mixed chloroethyl dichlorobenzenes, there was added 300 milliliters of monomethyl ether of diethylene glycol, 1 gram ditertiary butyl catechol, 1 gram dichloroquinone, and 1 gram of diamyl hydroquinone. The resultant mixture was subjected to distillation at an absolute pressure of 28–30 millimeters of mercury and an azeotrope of the dichlorostyrenes and the entraining agent was taken off overhead at a temperature of 100–101° C. The mixture was washed with water to remove the entraining agent and dried resulting in 47 milliliters of mixed dichlorostyrenes having an iodine value of 141.6 and a side chain chlorine content of 0.03% by weight. There was no substantial polymerization of the dichlorostyrenes during this separation.

Example III

To 100 milliliters of crude trichlorostyrenes contaminated with chloroethyl trichlorobenzenes and having an iodine value of 63.6 and a side chain chlorine content of 7.3%, there was added 196 milliliters of monoisoamyl ether of diethylene glycol and 1 gram each of tertiary butyl phenyl catechol, diamyl hydroquinone and ditertiary butyl hydroquinone. This mixture was heated at an absolute pressure of 6.7 millimeters of mercury and there was taken off at a temperature of 101–2.5° C. as an overhead distillate, the azeotrope of trichlorostyrene and the entraining agent, 90% of the trichlorostyrene thus being recovered. The distillate was washed with water to remove the entraining agent and the purified trichlorostyrene dried and was thereafter found to have an iodine value of 114.2 compared with the theoretical value of 122.3, a side-chain chlorine content of 0.032% and a refractive index at 25° of 1.5972. No appreciable polymerization resulted.

By my process the polymerizable vinyl aromatic is quickly carried out of the heated zone and is then cooled so that the period during which the vinyl aromatic is at a polymerizing temperature during the separation is reduced to a minimum. In this respect the process is essentially different from previously proposed separations of such materials by azeotropic distillation whereby the vinyl aromatics were retained in the heating zone of the distilling operation and recovered therefrom as a bottoms.

I claim:

1. Process for separating vinyl aromatic compounds selected from the group consisting of styrene and nuclear chlorinated styrenes in a state of high purity from mixtures thereof with corresponding choroethyl aromatic compounds which comprises azeotropically distilling the crude vinyl composition using as the entrainer a monoalkyl ether of diethylene glycol in which the alkyl group contains from 1 to 5 carbon atoms thereby forming an azeotrope having a boiling point lower than that of the contaminating chloroethyl compound or its azeotropes with the particular entrainer, the vinyl aromatic compounds being carried off overhead as vapors while the contaminants remain in the bottoms.

2. Process for separating nuclear chlorostyrenes in a state of high purity from mixtures thereof with chloroethyl nuclear chlorobenzenes which comprises azeotropically distilling the chlorostyrenes using as the entrainer a monoalkyl ether of diethylene glycol in which the alkyl group contains from 1 to 5 carbon atoms thereby forming an azeotrope having a boiling point lower than that of the contaminating chloroethyl chlorobenzenes or their azeotropes with a particular entrainer, the nuclear chlorostyrenes being carried off overhead as vapors while the chloroethyl chlorobenzenes remain in the bottoms.

3. Process for separating nuclear dichlorostyrenes in a state of high purity from mixtures thereof with chloroethyl nuclear dichlorobenzenes which comprises azeotropically distilling the dichlorostyrenes using as the entrainer a monoalkyl ether of diethylene glycol in which the akyl group contains from 1 to 5 carbon atoms thereby forming an azeotrope having a boiling point lower than that of the contaminating chloroethyl dichlorobenzenes or their azeotropes with a particular entrainer, the nuclear dichlorostyrenes being carried off overhead as vapors while the chloroethyl dichlorobenzenes remain in the bottoms.

4. The process of claim 3 in which the entrainer is the monomethyl ether of diethylene glycol.

5. The process of claim 3 in which a polymerization inhibitor is mixed with a crude vinyl aromatic composition being distilled.

6. The process of claim 3 in which the azeotropic distillation is carried on at a sub-atmospheric pressure within the range of 5 to 50 mm. of mercury absolute pressure.

JOHN W. CHURCHILL.

REFERENCES CITED

The following references are of record in the file of this patent:

UNITED STATES PATENTS

| Number | Name | Date |
|---|---|---|
| 2,358,129 | Lake | Sept. 12, 1944 |
| 2,385,235 | Schneider | Sept. 18, 1945 |
| 2,397,653 | Erickson | Apr. 2, 1946 |
| 2,442,229 | Berg et al. | May 25, 1948 |
| 2,467,197 | Engel | Apr. 12, 1949 |
| 2,467,198 | Greene | Apr. 12, 1949 |

OTHER REFERENCES

Mair et al.: Bureau of Standards Journal of Research, vol. 27, pp. 39–63 (July 1941). (Copy in Scientific Library.)